(12) United States Patent
Rennich et al.

(10) Patent No.: US 11,933,883 B2
(45) Date of Patent: Mar. 19, 2024

(54) SYSTEM AND METHOD FOR SELF-CONTAINED HIGH-PRECISION NAVIGATION

(71) Applicant: Aloft Sensing, Inc., Ann Arbor, MI (US)

(72) Inventors: Patrick Rennich, Ann Arbor, MI (US); Lauren Wye, Palo Alto, CA (US)

(73) Assignee: Aloft Sensing, Inc., Ann Arbor, MI (US)

( * ) Notice: Subject to any disclaimer, the term of this patent is extended or adjusted under 35 U.S.C. 154(b) by 1 day.

(21) Appl. No.: 17/484,176

(22) Filed: Sep. 24, 2021

(65) Prior Publication Data

US 2023/0102073 A1 Mar. 30, 2023

(51) Int. Cl.
*G01S 13/90* (2006.01)
*G01S 13/42* (2006.01)

(52) U.S. Cl.
CPC .......... *G01S 13/9023* (2013.01); *G01S 13/42* (2013.01)

(58) Field of Classification Search
CPC .............................. G01S 13/9023; G01S 13/42
USPC ........................................................ 342/25 A
See application file for complete search history.

(56) References Cited

U.S. PATENT DOCUMENTS

| | | | | |
|---|---|---|---|---|
| 4,723,124 A | * | 2/1988 | Boles | G01S 13/9023 342/25 C |
| 4,975,704 A | * | 12/1990 | Gabriel | G01S 13/87 342/25 C |
| 5,488,374 A | * | 1/1996 | Frankot | G01S 13/9023 342/25 C |
| 5,726,656 A | * | 3/1998 | Frankot | G01S 13/9023 342/25 C |
| 5,867,119 A | * | 2/1999 | Corrubia | G01S 13/9023 342/194 |
| 6,072,433 A | * | 6/2000 | Young | G01S 19/53 342/386 |
| 6,114,984 A | * | 9/2000 | McNiff | G01S 13/723 342/146 |
| 6,150,972 A | * | 11/2000 | Bickel | G01S 13/9023 342/25 C |

(Continued)

FOREIGN PATENT DOCUMENTS

| | | |
|---|---|---|
| WO | 2005098473 A1 | 10/2005 |
| WO | 2007071113 A1 | 6/2007 |

(Continued)

OTHER PUBLICATIONS

Jiang, S., Wang, B., Xiang, M., Fu, X., Sun, X., "Method for InSAR/INS navigation system based on interferogram matching" IET Radar, Sonar & Navigation, IET Journals, The Institute of Engineering and Technology, 2018, vol. 12 Iss. 9, pp. 938-944.

(Continued)

*Primary Examiner* — Nuzhat Pervin
(74) *Attorney, Agent, or Firm* — Hinckley Allen & Snyder; Stephen Holmes

(57) ABSTRACT

A self-contained, high precision navigation method and system for a mobile vehicle comprising an active coherent imaging sensor array with multiple receivers that observes the surrounding environment and a digital processing component that processes the received signals to form interferometric images and determine the precise three-dimensional location and three-dimensional orientation of the vehicle within that environment.

8 Claims, 3 Drawing Sheets

(56) References Cited

U.S. PATENT DOCUMENTS

| | | | |
|---|---|---|---|
| 6,362,775 B1* | 3/2002 | Goebel | G01S 13/87 342/63 |
| 6,573,856 B1* | 6/2003 | Obenshain | G01S 13/9023 342/25 R |
| 6,664,917 B2* | 12/2003 | Goebel | G01S 13/9023 342/63 |
| 6,677,885 B1* | 1/2004 | Frankot | G01S 13/9023 342/25 R |
| 6,741,202 B1* | 5/2004 | Krikorian | G01S 13/9092 342/25 C |
| 6,864,828 B1* | 3/2005 | Golubiewski | G01S 13/87 342/25 C |
| 7,768,441 B2* | 8/2010 | Davis | G01S 13/9023 342/25 R |
| 8,384,583 B2* | 2/2013 | Leva | G01S 13/9023 342/25 C |
| 8,805,005 B2* | 8/2014 | Jahangir | G01S 13/9029 348/169 |
| 8,867,311 B2* | 10/2014 | Rikoski | G01S 15/8904 367/88 |
| 9,036,452 B2* | 5/2015 | Rikoski | G01C 21/005 367/88 |
| 9,041,915 B2* | 5/2015 | Earhart | G01S 17/894 356/3.01 |
| 9,417,323 B2* | 8/2016 | Carande | G01S 13/9023 |
| 9,523,768 B1* | 12/2016 | Rincon | G01S 13/9023 |
| 10,006,995 B2 | 6/2018 | Jung et al. | |
| 10,551,162 B2* | 2/2020 | Floyd | G01B 9/02041 |
| 10,613,209 B2* | 4/2020 | Emami | G05D 1/0033 |
| 10,823,844 B2 | 11/2020 | Arndt et al. | |
| 11,618,502 B2* | 4/2023 | Senn | G01S 17/42 701/28 |
| 11,624,611 B1 | 4/2023 | Vosburgh | G01C 17/28 33/354 |
| 2002/0050942 A1* | 5/2002 | Grisham | G01S 13/9023 342/25 C |
| 2004/0227954 A1 | 11/2004 | Xie | |
| 2005/0004748 A1* | 1/2005 | Pinto | G01S 19/54 701/470 |
| 2006/0262004 A1* | 11/2006 | Buck | G01S 13/9023 342/25 C |
| 2008/0084551 A1* | 4/2008 | Harnisch | G01S 13/9005 342/25 A |
| 2010/0283832 A1* | 11/2010 | Lin | G06F 18/256 348/46 |
| 2011/0163911 A1* | 7/2011 | Costantini | G01S 13/9023 342/25 C |
| 2011/0298655 A1* | 12/2011 | Leva | G01S 13/9023 342/25 C |
| 2012/0019410 A1* | 1/2012 | Ferretti | G01S 13/9023 342/25 C |
| 2012/0281503 A1* | 11/2012 | Rikoski | G01S 15/8904 367/88 |
| 2012/0281504 A1* | 11/2012 | Rikoski | G01C 21/005 367/88 |
| 2012/0281505 A1* | 11/2012 | Rikoski | G01C 21/005 367/88 |
| 2012/0281506 A1* | 11/2012 | Rikoski | G01V 1/38 367/88 |
| 2012/0281507 A1* | 11/2012 | Rikoski | G05D 1/0692 367/88 |
| 2012/0319893 A1* | 12/2012 | Yun | G01S 13/9023 342/25 C |
| 2013/0083621 A1* | 4/2013 | Rikoski | G01S 15/89 367/7 |
| 2014/0328141 A1* | 11/2014 | Rikoski | G01S 15/588 367/87 |
| 2018/0031695 A1* | 2/2018 | Carswell | G01S 13/89 |
| 2018/0081051 A1* | 3/2018 | Michelini | G01S 13/878 |
| 2018/0149466 A1* | 5/2018 | Floyd | G01S 13/90 |
| 2020/0256979 A1* | 8/2020 | Savchenkov | G01S 13/9011 |
| 2021/0347460 A1* | 11/2021 | Watters | G05D 1/104 |

FOREIGN PATENT DOCUMENTS

| | | | | |
|---|---|---|---|---|
| WO | WO-2017017518 | A1 * | 2/2017 | ......... G01S 13/9023 |
| WO | WO-2017055901 | A1 * | 4/2017 | ......... G01S 13/9023 |

OTHER PUBLICATIONS

Prats, Pau, Reigber, Andeas, Mallorqui, Jordi J., "Interpolation-Free Coregistration and Phase-Correction of Airborne SAR Interferograms", IEEE Geoscience and Remote Sensing Letters, vol. 1, No. 3, Jul. 2004.

Wang, B., Maosheng, X., Longyong, C., "Motion compensation on baseline oscillations for distributed array SAR by combining interferograms and inertial measurement", IET Radar, Sonar & Navigation, IET Journals—The Institution of Engineering and Technology, IET Radar Sonar Navig., 2017, vol. 11 Iss. 8, pp. 1285-1291.

* cited by examiner

SYSTEM AND METHOD FOR SELF-CONTAINED HIGH-PRECISION NAVIGATION

BACKGROUND OF THE INVENTION

The present disclosure relates generally to high precision navigation systems. More specifically, the present disclosure relates to a method and system for self-contained high-precision navigation of a vehicle comprising an active coherent imaging sensor array with multiple receivers that observes the surrounding environment and a digital processing component that processes the received signals and produces interferometric images to determine the precise three-dimensional location and three-dimensional orientation of the vehicle within that environment.

Currently, there are several existing technologies for localizing a mobile vehicle within an environment. Many of the existing technologies use sensors such as optical cameras, lidar, acoustic sounders, or radar. Each have their limitations and disadvantages. For example, optical cameras rely upon external illumination and cannot operate in fog or other inclement weather. While lidar provides its own illumination, likewise, its performance degrades in inclement weather. Existing technologies that employ acoustic sounders and radar provide their own illumination and are robust against weather, but they lack sufficient accuracy.

Other technologies such as the Global Positioning System (GPS) provide position information by utilizing support systems external to the mobile vehicle. External support systems are not always available and can be intentionally or unintentionally blocked or otherwise corrupted. Furthermore, these systems do not provide orientation information.

Existing Inertial Measurement Units (IMUs) provide location and orientation information, but they are prone to drift over time without an external mechanism to constrain the drift. Even the highest-quality IMUs drift over time and cannot maintain accuracy relative to the environment over longer terms.

In one known prior art system, an integrated Interferometric Synthetic Aperture Radar (SAR) aided Inertial Navigation System (InSAR/INS) is disclosed that operates based on interferogram matching. Terrain undulation and platform attitude can be reflected in the interferometric phase; hence, interferogram matching can provide location shift information. In this system a single InSAR Interferogram is captured and compared to a Digital Elevation Model (DEM) reference.

Another system discloses a Distributed Array SAR system which combines interferograms with inertial measurements. This disclosure deals with issues created from using multiple antennas distributed over an airplane wing which moves. The system requires a rigid baseline, combined with a flexible baseline, and integrates Motion Compensation (MOCO). Small low-precision inertial navigation sensors are fixed to the distributed antennas and used to measure relative movement. However, because of its low precision, a small INS cannot meet the demands of MOCO.

U.S. Pat. No. 6,677,885 to Franklot, shows an Interferometric Synthetic Aperture Radar (INSAR) using a long and short baseline approach with a single antenna and multiple passes.

U.S. patent Ser. No. 10/823,844 to Arndt, shows a method of analyzing a vehicle's surroundings. The method includes the steps of arranging a first sensor group with at least two radar sensors on a vehicle, emitting radar waves using the radar sensors into the vehicle environment, reflecting the emitted radar waves at objects in the vehicle's environment, receiving the reflected radar waves using the radar sensors, identifying information about the vehicle's environment from the received radar waves and outputting the radar information. In order to improve the analysis of the carriageway environment, the radar sensors are arranged on the vehicle such that the emitted and received radar waves interfere. Radar information is obtained by taking account of the resulting interference data.

U.S. Patent Publication Number 2004/0227954 to Xie, shows an optical navigation device for determining movement relative to an object. The device includes a source of optical radiation for illuminating the object, and a detector for capturing phase patterns in the optical radiation after the optical radiation returns from the object. The phase patterns are correlated with optical nonuniformities of the object.

While the prior implementations described above demonstrate that the broad concept of using interferograms for position along with combining or comparing the IMU data with the obtained image data is generally known, these prior systems still lack in precision positioning reference and rely on comparison to externally obtained data sets to perform the comparison.

BRIEF SUMMARY OF THE INVENTION

There is therefore a need for a standalone navigational system that is capable of highly precise three-dimensional location and three-dimensional orientation of the vehicle within an environment without the need for external systems or inputs.

In this regard, the present disclosure describes a system using multiple receivers in a two-dimensional (2D) array that computes interferograms across all pairs of receivers to estimate the error in navigation relative to the vehicle's expected navigation state, correcting and updating that state information in the process. In a first exemplary embodiment, the vehicle's expected navigation state is provided by means of forward projection of the previous navigation solutions. In another exemplary embodiment, the vehicles navigation state is provided by another method for concurrently measuring the position and orientation of the vehicle, such as measurements provided by an inertial measurement unit (IMU).

The present disclosure provides a method and system of self-contained high-precision navigation comprising an active coherent imaging sensor array with multiple receivers that observes the surrounding environment and a digital processing component that processes the received signals and produces interferometric images to determine the precise three-dimensional location and three-dimensional orientation of the system within that environment. The system employs a two-dimensional array of at least three receivers and at least one transmitter that are directed towards the surrounding environment. The two-dimensional array is connected to a digital processing unit. For mobile vehicles with low kinematic dynamics, this system may use only the receiver array and the digital processing unit with forward projection of the navigation state to sufficiently maintain the full navigation solution. For vehicles with high kinematic dynamics, an inertial measurement component, such as an IMU, may be connected to the digital processing unit to provide a comparative navigation state to complete the system.

The system operates by transmitting acoustic or electromagnetic energy, via the transmitter, toward the environment. The environment reflects the transmitted energy which is coherently received by at least three receivers that are arranged in the two-dimensional array. As the mobile vehicle upon which the system is mounted moves, the transmitter continues to transmit, and the receivers continue to receive the reflected energy. The energy reflected from the environment is digitized at the receivers and sent to the digital processing unit.

Additionally, as the vehicle moves, either forward propagation of the navigation solution or concurrent inertial measurements provide information relating to the position and orientation of the vehicle-mounted array to the digital processing unit. Using this motion information and the information from the receivers, the digital processing unit creates coherent images of the environment from the received signals. One image is created for each of the receivers. The created images are compared on a pair-wise basis and coherently interfered to produce interferograms. One interferogram is produced for each pair-wise combination of receivers. The interferograms are then used to produce a precise estimate of the position and orientation error relative to the vehicle's expected position and orientation state. The vehicle's expected position and orientation state is based on the forward propagation of previous navigation solutions and/or the concurrent inertial measurement data. The interferogram-based position and orientation error estimates are used to precisely update the vehicle's location and orientation within the environment. The precision and accuracy of the receiver positioning is a small fraction (~1/100) of the transmit signal's wavelength. This leads to micron-level localization and milli-degree orientation of the vehicle, which is a substantial improvement over other prior art approaches.

The system can be used in any environment where the objects and surfaces within that environment reflect enough energy to be received by the receivers, and a sufficient number of objects and surfaces distributed within that environment are stationary at the scale of the time it takes for one receiver within the array to move to the location of another receiver within the array. The system can be used at short distances such as inside a building or in a tunnel and can also be used at long distances such as from a satellite in orbit around the Earth or another planet. The system can further be used at all distances in between, such as on low-altitude drones, mid- and high-altitude aircraft, and stratospheric balloons. The system can also be employed underwater with acoustic transmitters and receivers. With appropriate scaling of the strength of the transmit energy and sensitivity of the receivers, the inventive system can be used across a broad range of environments and vehicles.

In a preferred method of operation, an IMU is part of the system and serves two functions. First, the IMU provides a means to initialize the navigation solution, e.g., initialize the orientation of the moving vehicle upon which the system is mounted. Second, the IMU provides a means to measure concurrent position and orientation that is used by the digital processing unit for image formation and is then updated with finer precision by the errors estimated from the collected interferograms. If an alternative means exists to initialize the navigation and an alternative means exists to estimate concurrent navigation information, the IMU can be removed from the system. In either case, the system provides a navigation solution relative to the initial position and orientation of the vehicle.

Accordingly, it is an object of the present disclosure to provide a self-contained navigational system using multiple receivers in a two-dimensional array that creates pairwise interferograms from each of the receivers for comparison with an expected position and orientation based on inertial measurement data. It is also an object of the present disclosure to provide the same self-contained navigational system without need of supporting inertial measurements, particularly for vehicles that exhibit low kinematic dynamics (e.g., an orbiting satellite). The present disclosure provides a navigational method and system that creates a unique interferogram from multiple receivers within a two-dimensional array to precisely update the vehicle's location and orientation within the environment.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWING FIGURES

In the drawings which illustrate the best mode presently contemplated for carrying out the present invention:

DETAILED DESCRIPTION OF THE INVENTION

Figure 1:
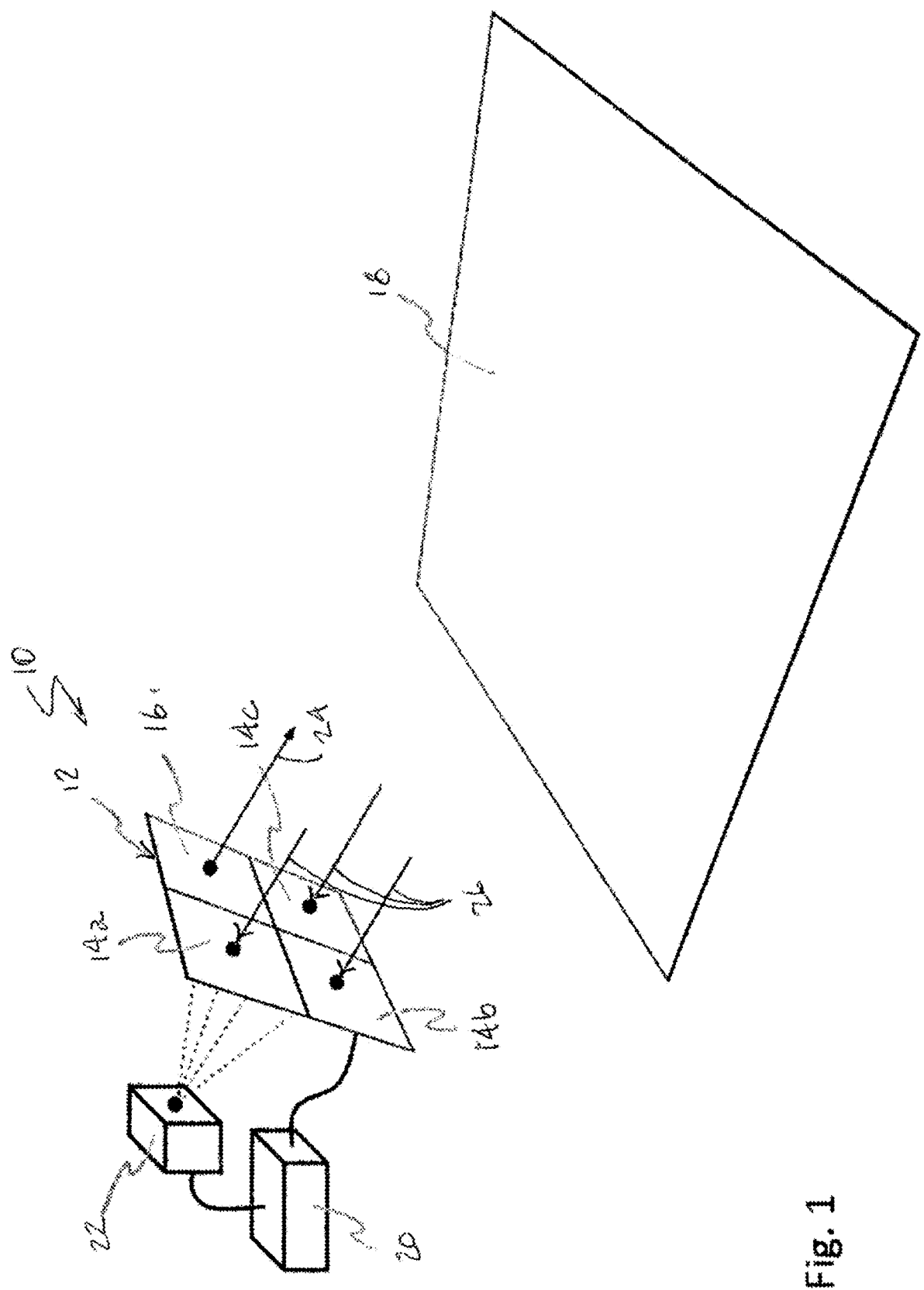
FIG. 1 is a schematic illustration of a self-contained high-precision navigation system and method in accordance with an embodiment of the present disclosure.

Now referring to the drawings, a method and system of self-contained high-precision navigation comprising an active coherent imaging sensor array with multiple receivers is shown and generally illustrated in the figures. The method and system employ a two-dimensional transmitter/receiver array that observes the surrounding environment and a digital processing component that processes the received signals and produces interferometric images to determine the precise three-dimensional location and three-dimensional orientation of the system within that environment. In an exemplary embodiment, the system employs a two-dimensional array of at least three receivers and at least one transmitter that are directed towards the surrounding environment. The two-dimensional array is connected to a digital processing unit. In a preferred method of operation, an inertial measurement unit (IMU) is also connected to the digital processing unit.

Referring now to FIG. 1, in an exemplary embodiment the system 10 generally comprises a two-dimensional array 12 of at least three receivers 14a, 14b, 14c and at least one transmitter 16. The fixed two-dimensional array 12 is mounted or supported in a manner such that the array 12 is directed towards the surrounding environment 18. Additionally, the two-dimensional array 12 is connected to a digital processing unit 20. An inertial measurement unit (IMU) 22 is also connected to the digital processing unit 20 in a position that is fixed relative to the array 12.

The system 10 in its most general operation transmits acoustic or electro-magnetic energy 24, via the transmitter 16, toward the environment 18. The environment 18 reflects the transmitted energy wherein the reflected energy 26 is coherently received at at least three receivers 14a, 14b, 14c that are arrayed in the two-dimensional array 12. As the mobile vehicle upon which the system 10 is mounted moves, the transmitter 16 continues to transmit energy 24, and the receivers 14a, 14b, 14c continue to receive the reflected energy 26. The reflected energy 26 from the environment 18 is captured and digitized at the receivers 14a, 14b, 14c and sent to the digital processing unit 20.

Additionally, in some embodiments of the invention, the IMU 22 detects acceleration and rotation rate information relating to the position and orientation of the vehicle mounted array 10 and transmits this information to the digital processing unit 20 as the vehicle moves. The accuracy of the IMU measurements can be coarse in quality. Using the information from the receivers 14a, 14b, 14c and the IMU 22, the digital processing unit 20 creates coherent snapshot images of the environment 18 from the digitized reflected energy 26 collected at the receivers 14a, 14b, 14c as modified using the acceleration and rotation rate data from the IMU 22. One image is created for each of the receivers. The created images are compared to one another on a pair-wise basis and coherently interfered to produce interferograms. One interferogram is produced for each pair-wise combination of receivers 14a, 14b, 14c. The interferograms created from the reflected energy 26 detected from the environment 18 are then used to produce an estimate of the error in vehicle position and orientation relative to the vehicle position and orientation reported by the IMU 22. The errors are then used to precisely update the vehicle's location and orientation within the environment 18. The precision and accuracy of the localization computed is a small fraction (~1/100) of the transmit signal's wavelength which enables micron-level positioning and milli-degree orientation and achieves improved localization performance over other approaches.

The same process can be applied to a system without an IMU 22 using forward projection of previous navigation solutions to provide estimates of the vehicle's expected position and orientation within the environment 18 for use in the interferogram-based corrections, as long as the kinematic dynamics are low. For situations of high kinematic dynamics, the same process used with the IMU 22 can be applied to a system without an IMU 22 as long as there is an alternative means to provide some level of position and orientation estimates for use in the interferogram-based corrections.

The system 10 of the present disclosure can be used in any environment 18 where objects and surfaces within the environment 18 reflect enough energy to be received by the receivers 14a, 14b, 14c, and a sufficient number of objects and surfaces distributed within that environment are stationary at the scale of the time it takes for one receiver within the array to move to the location of another receiver within the array. The system 10 can be used at short distances such as inside a building or in a tunnel as well as for far distances such as from a satellite in orbit around the Earth or another planet. With appropriate scaling of the strength of the transmit energy and sensitivity of the receivers, the system 10 can be deployed for use in conjunction within a broad range of environments and vehicles. It should be appreciated by one skilled in the art that an exhaustive list of environments and vehicles need not be listed as the system 10 is self-contained and intended to operate in a standalone manner thereby being unlimited in its deployment relative to vehicles and environments, except as specifically stated herein.

Figure 2:
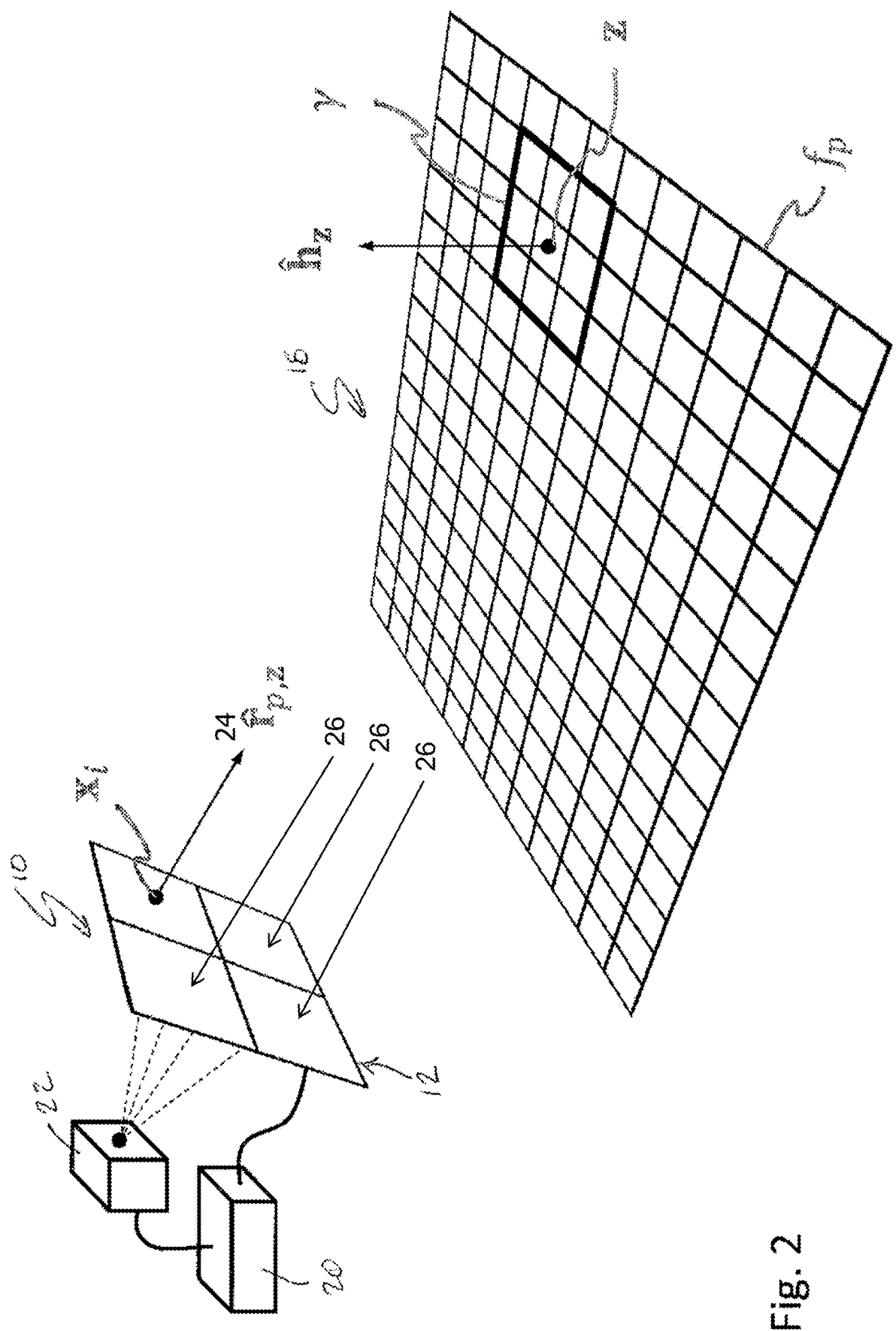
FIG. 2 is a schematic illustration of the relationship between the reflected energy images captured by each receiver for pairwise computation of interferograms.

Turning now to FIG. 2, images are formed from the digitized reflected energy 26 using the synthetic aperture technique known as backprojection. This technique directly incorporates the locations of each receive phase-center represented by $x_i$ and the assumed locations of the objects and surfaces from which the reflected energy 26 is gathered from the environment 18. Backprojection calculates the signal received at a phase-center for the $i^{th}$ pulse as a function of range, r, denoted as $s_i(r)$, and is formulated as:

$$I_z = \sum_{i=1}^{N} s_i(\|x_i - z\|) \cdot e^{j4\pi\|x_i - z\|/\lambda}$$

wherein:
$I_z$—represents the environmental response,
$s_i(r)$—represents signal received at a phase-center, $r = \|x_i - z\|$, $x_i$—represents the time-evolving phase center location in three-dimensional space,
z—represents a pixel being observed in the environment, and
$\lambda$—represents the wavelength of the propagating energy.

To determine the complex environment response, $I_z$, the signal from range location $r = \|x_i - z\|$ is summed over a set of N pulses, and the collection of these responses for the $p^{th}$ receive phase-center over all pixel locations constitutes the coherent image for that receive phase-center, denoted as $f_p$.

Once the coherent images have been formed for all the receive phase-centers, interferograms are computed between all pairwise combinations of phase-centers. Each interferogram is computed using the complex cross correlation coefficient for a pair of coherent images $f_p$ and $f_q$:

$$\gamma = \frac{\sum_{m=1}^{M} f_p(m) f_q(m)}{\sqrt{\sum_{m=1}^{M} |f_p(m)|^2 \cdot \sum_{m=1}^{M} |f'_q(m)|^2}},$$

where ·* indicates complex conjugation. This coefficient is computed across the image over a neighborhood of M pixel locations where M is chosen based on the desired signal-to-noise ratio in the resulting interferometric phase.

The interferometric phase for the $pq^{th}$ phase-center pair at pixel location z, denoted as $\phi_{pq,z}$, is described precisely with the following equation:

$$\phi_{pq,z} \frac{\lambda}{4\pi} = \left[\varepsilon_p \cdot \hat{r}_{p,z} - \varepsilon_q \cdot \hat{r}_{q,z} + \delta_z \hat{h}_z \cdot (\hat{r}_{p,z} - \hat{r}_{q,z})\right]$$

where $\varepsilon_p$ and $\varepsilon_q$ are the position errors associated with the $p^{th}$ and $q^{th}$ phase-centers respectively. The unit vectors $\hat{r}_{p,z}$ and $\hat{r}_{q,z}$ point from the $p^{th}$ and $q^{th}$ phase-centers to the pixel location z. The unit vector $\hat{h}_z$ is the height direction at pixel location z, and, finally, $\delta_z$ represents the height error at this pixel location.

Based on the above calculations an interferometric phase measurement is produced for each pixel location and each pairwise combination of receive phase-centers. These interferometric phase measurements constitute an overdetermined system of equations that is used to solve for the phase-center position errors and the pixel height errors using the method of least squares. Since the noise in the phase measurements is Gaussian, this approach is the Best Linear Unbiased Estimate (BLUE) of the phase-center position and pixel height errors. To maintain a unique solution, the first phase-center is assumed to have no errors, resulting in estimation of phase-center errors that are relative to the first.

The orientation and position error of the vehicle is then determined based on the estimated phase-center position errors. First, the expected phase-center positions, determined either from inertial measurements or forward propagation of prior navigation solutions, are corrected by the BLUE-estimated phase-center errors. The three-dimensional distance between the centroids of the expected and corrected phase center positions establishes the three-dimensional position error of the vehicle.

Figure 3:
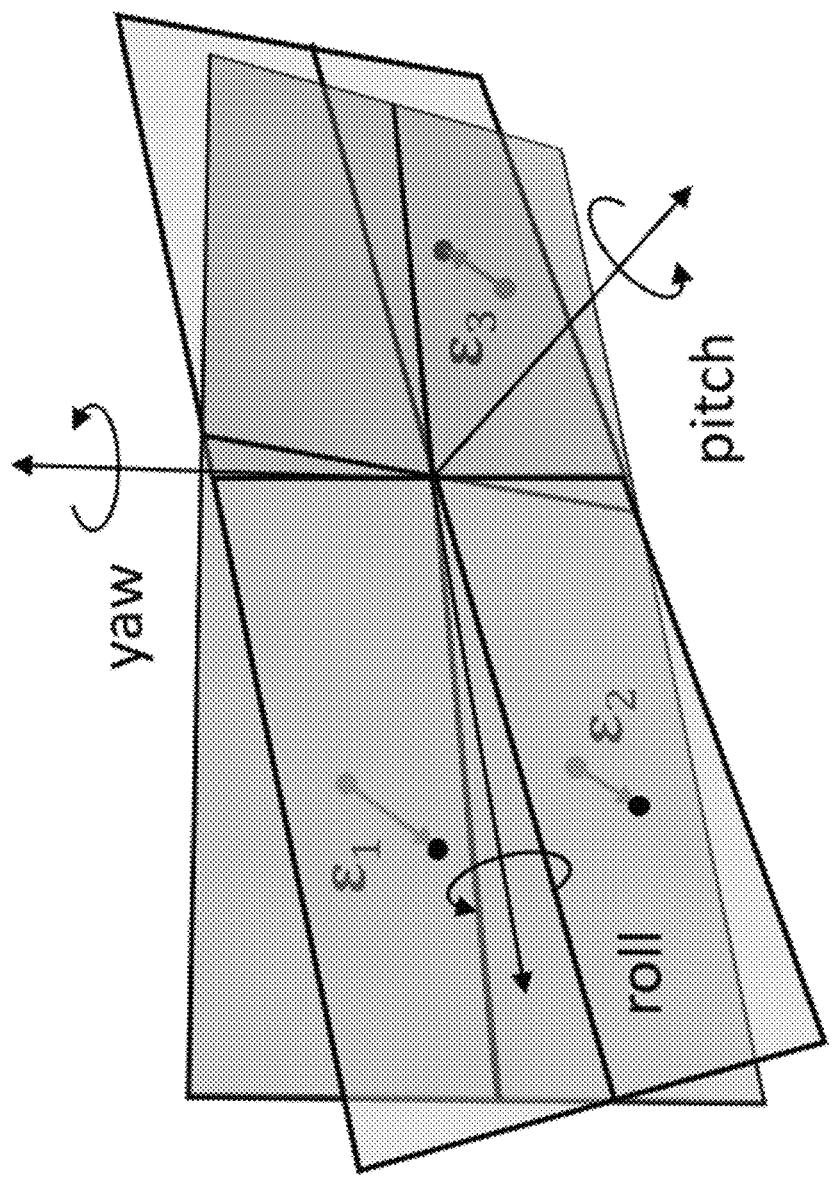
FIG. 3 is a schematic illustration of the manner in which the position errors of the receive channels determined from the interferograms are employed to estimate roll, pitch and yaw information of the vehicle.

Turning now to FIG. 3, the Kabsch algorithm is used to estimate the roll, pitch, and yaw rotation angles between the expected phase-center positions and the corrected phase-center positions. The result is the three-dimensional orientation error of the vehicle. These estimated vehicle orientation errors are then used to update the vehicle's complete navigation solution.

This system and method can be used in any environment where the objects and surfaces within that environment reflect enough energy to be received by the receivers, and a sufficient number of objects and surfaces distributed within that environment are stationary at the scale of the time it takes one receiver within the array to move to the location of another receiver within the array. For example, the ocean surface is a moving environment, but electro-magnetic energy reflected from that surface is substantially the same as electro-magnetic energy reflected from that surface a short time later, when the trailing receiver views the same scene. With receivers arrayed appropriately to mitigate the impact of the motion, the system can operate within this type of moving environment. Similarly, the system can be used at short distances such as inside a building or in a tunnel and can also be used at far distances such as from a satellite in orbit around the Earth or another planet. With appropriate scaling of the strength of the transmit energy and sensitivity of the receivers, the invention can be used across a broad range of environments and vehicles.

In one of the preferred methods of operation, an IMU is part of the system and serves two functions. First, the IMU provides a means to initialize the navigation solution, e.g., initialize the orientation of the moving vehicle upon which the system is mounted. Second, the IMU provides a means to measure concurrent position and orientation that is used by the digital processing unit for image formation and is then updated with finer precision by the errors estimated from the collected interferograms. If an alternative means exists to initialize the navigation and an alternative means exists to estimate concurrent navigation information, the IMU can be removed from the system. In either case, the system provides a navigation solution relative to the initial position and orientation of the vehicle.

The feature of using coherent images from an array of active sensors to form interferograms of the environment that are then used to update the navigation solution is believed to be the novel and unique aspect of this disclosure. As such, the system employs an active radar or acoustic sensor array to coherently image the surrounding environment. The coherent imaging step and the processing of those coherent images provides orders-of-magnitude improved localization and orientation accuracy beyond existing technologies. For example, because the localization precision is on the order of a small fraction of the transmission wavelength, and wavelengths are typically centimeters or less, micron-level localization and milli-degree orientation are possible.

It should be appreciated that the disclosed system is a self-contained mechanism such that the operation is entirely under the control of the user and no coordination or communication with external support systems, like GPS, is required. This property enables robust operation in environments that block or otherwise interfere with external support systems. This allows the system to provide a continuous estimate of localization and orientation relative to the environment, provided the system maintains acoustic or electro-magnetic contact with the environment. These features ensure that the localization and orientation of the system relative to the environment is well maintained.

It can therefore be seen that the present disclosure provides a self-contained navigational system using multiple receivers in a two-dimensional array that creates pairwise interferograms from each of the receivers to precisely correct the position and orientation estimates based on inertial measurement data or based on forward propagation of previous navigation solutions. Further, the present disclosure provides a navigational method and system that creates a unique interferogram from multiple receivers within a two-dimensional array to precisely update the vehicle's location and orientation within the environment. For these reasons, the present disclosure is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A mobile vehicle mounted system for determining positioning and orientation of said mobile vehicle within an environment, comprising:
   a transmitter;
   a two-dimensional receiver array including at least three receivers,
   said transmitter directing energy at an environment, said environment reflecting energy back to said at least three receivers, said at least three receivers capturing and digitizing said reflected energy; and
   a digital processing unit in communication with said transmitter and said two-dimensional receiver array, said digital processing unit creating a coherent two-dimensional image from the digitized reflected energy captured by each of said three receivers and producing a plurality of two-dimensional interferograms from a plurality of pair-wise combinations of said created coherent two-dimensional images,
   said digital processing unit further processing the plurality of two-dimensional interferograms to produce estimates of error of the position and orientation of the mobile vehicle relative to the expected system position and orientation and incorporating said errors into a navigation solution of said mobile vehicle.

2. The system of claim 1, wherein said system is continuously creating and processing said two-dimensional coherent images, continuously producing said two-dimensional interferograms in pair-wise combinations, continuously producing error estimates and continuously incorporating said errors into successive navigation solutions for said mobile vehicle as a position of said mobile vehicle changes.

3. The system of claim 1, further comprising:
an inertial measuring unit positioned in fixed position relative to said two-dimensional receiver array and in communication with said digital processing unit, said inertial measuring unit detecting acceleration and rotation rate information relating to the expected position and orientation of the system and transmitting said information to the digital processing unit.

4. The system of claim 3, wherein said digital processing unit uses said interferograms to produce an estimate of the error in system position and orientation relative to the system position and orientation reported by said inertial measurement unit, and
wherein said estimates of position and orientation error are applied to the said position and orientation reported by the inertial measurement unit to precisely update the system position and orientation within the environment.

5. A method of determining positioning and orientation of a mobile vehicle within an environment, comprising:
providing a transmitter;
providing a two-dimensional receiver array including at least three receivers and a digital processing unit in communication with said transmitter and said two-dimensional receiver array;
directing energy at an environment using said transmitter;
capturing a reflection of said energy reflected by said environment using said at least three receivers, said at least three receivers capturing and digitizing said reflected energy;
transmitting said digitized reflected energy to said digital processing unit;
creating a coherent two-dimensional image from the digitized reflected energy captured by each of said three receivers and producing a plurality of two-dimensional interferograms from a plurality of pair-wise combinations of said created coherent two-dimensional images, said digital processing unit further processing the plurality of two-dimensional interferograms to produce estimates of error of the position and orientation of the mobile vehicle relative to the expected system position and orientation and incorporating said errors into a navigation solution of said mobile vehicle.

6. The method of claim 5, wherein said transmitting digitized reflected energy, creating images and comparing images to create digital processing unit is continuously creating processing said two-dimensional coherent images, continuously producing said two-dimensional interferograms in pair-wise combinations, continuously producing error estimates and continuously incorporating said errors into successive navigation solutions for said mobile vehicle as a position of said mobile vehicle changes.

7. The method of claim 5, further comprising:
providing an inertial measuring unit positioned in fixed position relative to said two-dimensional receiver array and in communication with said digital processing unit, said inertial measuring unit detecting acceleration and rotation rate information relating to the expected position and orientation of the system and transmitting said information to the digital processing unit.

8. The method of claim 7, wherein said digital processing unit uses said interferograms to produce an estimate of the error in position and orientation relative to the position and orientation reported by said inertial measurement unit, and
wherein said estimates of position and orientation error are applied to the said position and orientation reported by the inertial measurement unit to precisely update the position and orientation of the two-dimensional array within the environment.

\* \* \* \* \*